US006915303B2

(12) United States Patent
Kauffman

(10) Patent No.: US 6,915,303 B2
(45) Date of Patent: Jul. 5, 2005

(54) CODE GENERATOR SYSTEM FOR DIGITAL LIBRARIES

(75) Inventor: Steven V. Kauffman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 517 days.

(21) Appl. No.: 09/774,829

(22) Filed: Jan. 26, 2001

(65) Prior Publication Data
US 2002/0152221 A1 Oct. 17, 2002

(51) Int. Cl.[7] .............................................. G06F 17/30
(52) U.S. Cl. ...................... 707/102; 707/10; 707/104.1; 715/513
(58) Field of Search ...................... 707/10, 102, 103 R, 707/104.1, 2, 4, 100, 103, 1; 715/513; 434/322

(56) References Cited

U.S. PATENT DOCUMENTS

| | | | | |
|---|---|---|---|---|
| 5,499,371 A | | 3/1996 | Henninger et al. | 395/700 |
| 5,535,325 A | | 7/1996 | Cattell et al. | 395/161 |
| 5,564,048 A | | 10/1996 | Eick et al. | 395/600 |
| 5,802,524 A | | 9/1998 | Flowers et al. | 707/103 |
| 5,826,259 A | | 10/1998 | Doktor | 707/4 |
| 5,835,758 A | | 11/1998 | Nochur et al. | 395/613 |
| 5,873,093 A | | 2/1999 | Williamson et al. | 707/103 |
| 5,878,411 A | | 3/1999 | Burroughs et al. | 707/4 |
| 5,892,510 A | | 4/1999 | Lau et al. | 345/333 |
| 5,909,678 A | | 6/1999 | Bergman et al. | 707/4 |
| 5,937,409 A | | 8/1999 | Wetherbee | 707/103 |
| 5,970,490 A | * | 10/1999 | Morgenstern | 707/10 |
| 5,980,264 A | * | 11/1999 | Lundberg | 434/322 |
| 6,178,413 B1 | * | 1/2001 | Costin | 707/1 |
| 6,279,008 B1 | * | 8/2001 | Tung Ng et al. | 707/102 |
| 6,311,194 B1 | * | 10/2001 | Sheth et al. | 715/505 |
| 6,343,297 B1 | * | 1/2002 | D'Anjou et al. | 707/104.1 |
| 6,381,597 B1 | * | 4/2002 | Lin | 707/4 |
| 6,510,434 B1 | * | 1/2003 | Anderson et al. | 707/100 |

OTHER PUBLICATIONS

Logical Information Modeling of Web–Accessible Heterogeneous Digital Assets, Shah et al., Proceedings of the 1998 IEEE International Conference on research and Technology Advances in Digital Libraries, Apr., 1998, USA, pp. 266–275.*
"Embedded SQL Code Generator", http://www.delphion.com/tdbs/tdb?o=92A%2060809, IBM Technical Disclosure Bulletin, pp. 351–352, IBM Mar. 1992.
"Dynamically Configurable User Interface for the Manipulation of Data Objects", http://www.delphion.com/tdbs/tdb?o=94A%2060781, IBM Technical Disclosure Bulletin, pp. 23–30, Mar. 1994.
"Data Conversion Tool Kit", http://www.delphion.com/tdbs/tdb?o=95A%2062347, IBM Technical Disclosure Bulletin, pp. 477–480, Nov. 1995.
"Graphical Object Representation", http://www.delphion.com/tdbstdb?&order=91A+61305, IBM Technical Disclosure Bulletin, pp. 299–300, May 1991.

* cited by examiner

Primary Examiner—Shahid Al Alam
(74) Attorney, Agent, or Firm—Ohlandt, Greeley, Ruggiero & Perle, L.L.P.; Andre Gibbs

(57) ABSTRACT

A technique for creating a custom database is provided. A system description of a structure of a database is received. A structure for the custom database is generated based on the system description. In addition, a search engine based on the system description is generated to store and locate data in the custom database.

36 Claims, 3 Drawing Sheets

CODE GENERATOR SYSTEM FOR DIGITAL LIBRARIES

BACKGROUND OF THE INVENTION

1. Field of the Invention

This invention relates in general to computer-implemented database management systems, and, in particular, to creating a custom digital library using a system description to describe data in the digital library and a code generator to generate programs which store and locate data in the digital library based on the system specification.

2. Description of Related Art

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

In a digital library (DL), the multimedia object can be linked with the associated indexing information, since both are available in digital form. Integration of this legacy catalog information with the digitized object is crucial and is one of the great advantages of digital library technology. Different types of objects can be categorized differently as appropriate for each object type. Existing standards like MARC records for libraries, Finding Aids for archiving of special collections, etc. can be used when appropriate.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

When a customer-specific database is to be built, it is usually necessary to interview the customer regarding the content of the database. Then, the objects corresponding to the customer's needs are hard coded to build the specified database. In other words, programming code is generated for each kind of object of the database that was specified by the customer. By hard coding objects, the objects are stored in a predefined scheme based on the type of object.

There are a number of obvious shortcomings with this approach. First, hard coding individual databases requires significant time and money. For example, when new objects are to be added to the library, new code must be written to represent these objects. Similarly, when objects are altered or deleted, the database must be altered and reindexed. This process results in a very inefficient technique for generating custom databases. These shortcomings are further amplified when large, customer specified databases with large objects and/or a large number of objects are to be created. Consequently, the conventional, manual technique for hard-coded systems is inefficient and is not desirable for databases which may require numerous object modifications and additions within a digital library.

Further, other conventional systems which utilize code generators based on static or dynamic code generators also have shortcomings. For example, with code generators based on embedded static-SQL, code must still be written for each individual object, each added object, and each changed object. Further, for each new type of database request, a separate programming language function must be created. In addition, conventional dynamic embedded-SQL code generators do not perform as well as static embedded-SQL code generators and are generally directed to small databases rather than larger databases or custom databases.

Accordingly, there is a need in the art for a system that can create and manage custom databases using a search engine that is capable of efficient, run-time storing and locating of data within the database without generating new code, modifying existing code, or reindexing a database to reflect the addition, deletion or alteration of an object within a database.

SUMMARY OF THE INVENTION

To overcome the limitations in the prior art described above, and to overcome other limitations that will become apparent upon reading and understanding the present specification, the present invention discloses a method, apparatus, and article of manufacture for creating a custom digital library or database.

In accordance with the present invention, a system description of a structure of a database is received. A structure for the custom database is generated based on the system description. A search engine based on the system description is generated to store and retrieve data in the custom digital library or database.

BRIEF DESCRIPTION OF THE DRAWINGS

Referring now to the drawings in which like reference numbers represent corresponding parts throughout.

DETAILED DESCRIPTION

In the following description of embodiments of the present invention, reference is made to the accompanying drawings which form a part hereof, and which are shown by way of illustration embodiments in which the invention may be practiced. It is to be understood that other embodiments may be utilized as structural changes may be made without departing from the scope of the present invention.

Hardware Environment

Figure 1:
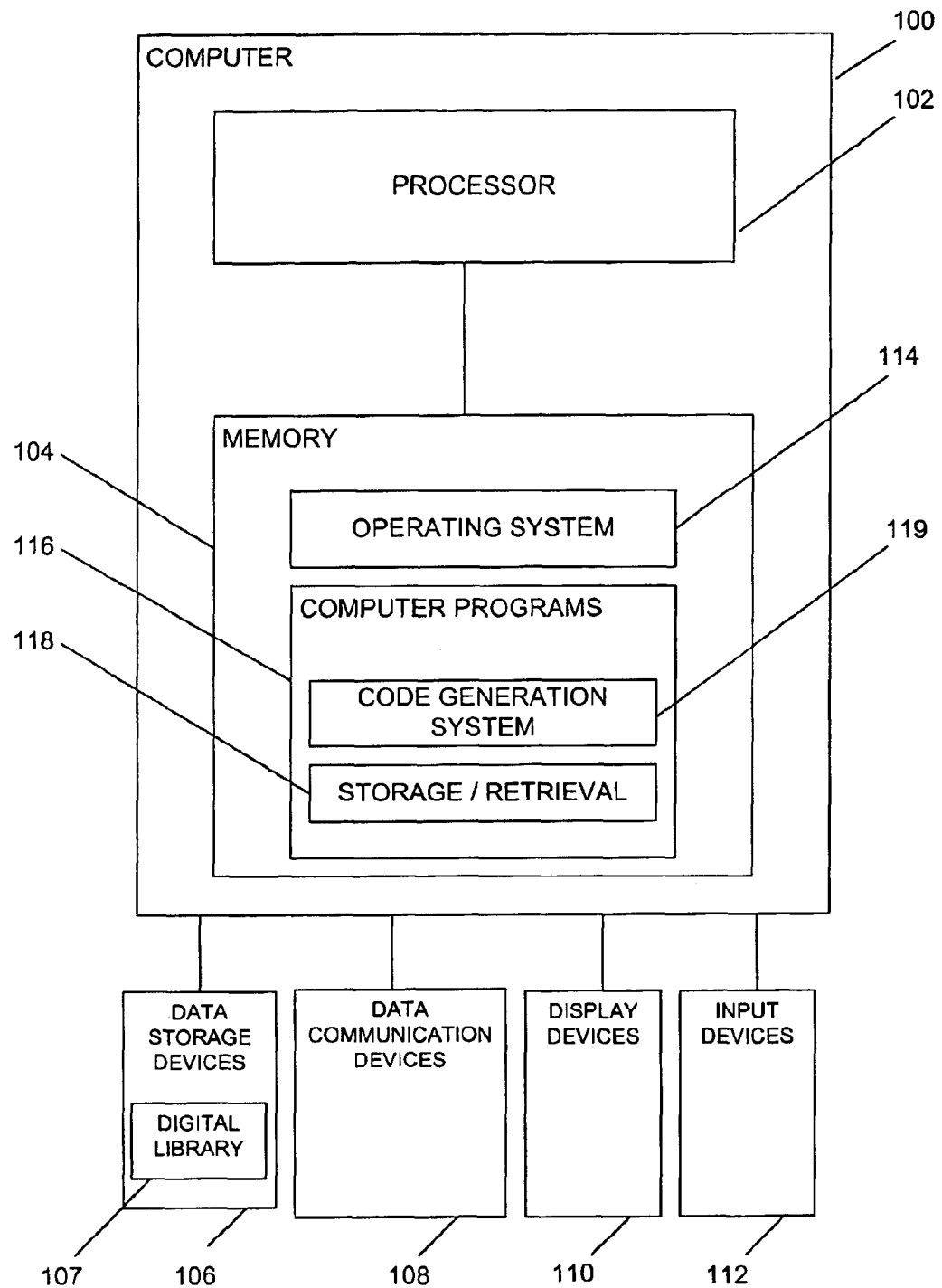
FIG. 1 schematically illustrates the hardware environment of one embodiment of the present invention, and more particularly, illustrates a typical database system.

FIG. 1 is a hardware environment used in one embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.) which may store, for example, digital libraries 107, data communications devices 108 (e.g., modems, network interfaces, etc.), display device 110 (e.g., CRT, LCD display, etc.), input devices 112 (e.g., mouse pointing device and keyboard). It is envisioned that attached to the computer 100 may be other devices, such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 114. The operating system 114 is booted into the memory 104 of the computer 100 for execution when the computer 100 is powered-on or reset. In turn, the operating system 114 then controls the execution of one or more computer programs 116, such as a storage and retrieval system 118, by the computer 100. The present invention is a code generation system 119 and is generally implemented in these computer programs 116, which execute under the control of the operating system 114 and cause the computer 100 to perform the desired functions as described herein.

The operating system 114 and computer programs 116 are comprised of instructions which, when read and executed by the computer 100, causes the computer 100 to perform the steps necessary to implement and/or use the code generation system 119. Generally, the operating system 114 and/or computer programs 116 are tangibly embodied in and/or readable from a device, carrier, or media, such as memory 104, data storage devices 106, and/or data communications devices 108. Under control of the operating system 114, the computer programs 116 may be loaded from the memory 104, data storage devices 106, and/or data communications devices 108 into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 1 is not intended to limit the present invention. Indeed, those skilled in the art will recognize that other alternative hardware environments may be used without departing from the scope of the present invention.

XML Summary

Extensible Markup Language (XML) is a new specification that is quickly gaining popularity for creating what are termed "XML documents". XML documents comprise structured data. XML documents are being shared between multiple businesses and between businesses and customers. With the longstanding use of relational databases, many businesses have stored their data in relational tables. Now, however, more businesses are storing data using XML documents.

The code generation system 119 utilizes markup files including, for example, Extensible Markup Language (XML) documents. XML is a subset of Standard Generalized Markup Language (SGML) which is used for documents with structured information. XML is a set of rules or guidelines for designing text formats for structured data using tags. XML is a new specification that is quickly gaining popularity for creating what are termed "XML documents" which may be structured by various elements or attributes (e.g., title, data, author, etc.). Once a document is structured in this manner, a structured search may be performed based on element or attribute values (or content).

XML describes a class of data objects or XML documents and partially describes the behavior of computer programs which process them. XML documents are made up of storage units called entities. Each entity contains either parsed or unparsed data. Parsed data is made up of characters, some of which form the character data in the document. Other parsed data may be in the markup form. Markup encodes a description of the document's storage layout and logical structure. XML provides a mechanism to impose constraints on the storage layout and logical structure. A software module called an XML processor is used to read XML documents and provide access to their content and structure.

XML works in conjunction with Extensible Stylesheet Language Transformation, (XSLT) and Extensible Markup Language Path (XPath). XML may also work in conjunction with a Document Object Model (DOM) or Namespace.

For interoperability, domain-specific tags called a vocabulary can be standardized using a Document Type Definition, so that applications in that domain understand the meaning of the tags.

Extensible Style Language Transformer or XSLT is a language for transforming XML documents into other XML documents. The XSLT specification defines the syntax and semantics of the XSLT language. XSLT-defined elements are distinguished by belonging to a specific XML namespace, which is referred to as the XSLT namespace. A transformation expressed in XSLT describes rules for transforming a source tree into a result tree.

XML Path or XPath addresses parts of an XML document. XPath gets its name from its use of a path notation as in URLs for navigating through the hierarchical structure of an XML document.

A Document Object Model (DOM) is a standard set of function calls for manipulating XML files from a programming language.

For example, a sample XML system specification is provided:

creates a structure for a custom database and creates one or more programs (e.g., a search engine) that store and locate data within the custom database. The programs store and locate data based on a markup file containing a system description of the structure of the custom database.

Figure 2:
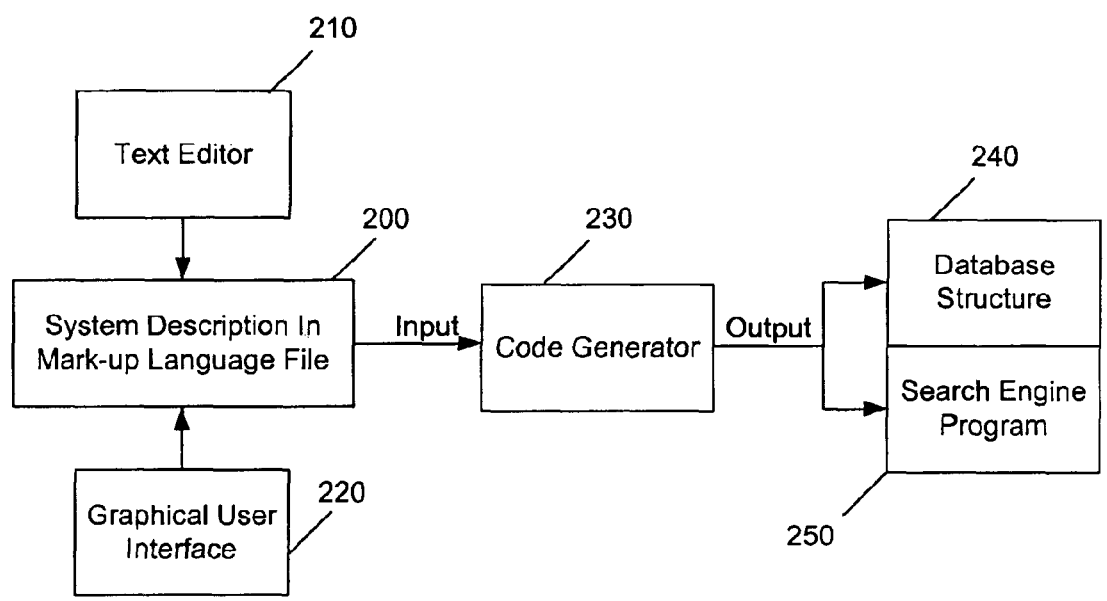
FIG. 2 schematically illustrates components utilized by the code generation system in one embodiment of the present invention.

FIG. 2, a schematic of components utilized by the code generation system 119, illustrates that a system description 200 of the structure of the custom database to be created comprises a markup language file. The specification may refer to both a "system description" and a "mark-up file," and both of these items refer to the markup file containing a system description 200. In one embodiment, the markup language file 200 may be constructed using a text editor 210. In an alternative embodiment, the markup language file 200 may be constructed through graphical user interface (GUI) 220.

The system description in the markup language file 200 is input into a code generator 230. The code generator 230 reads the markup language file 200, creates objects based on the system description, and outputs a structure of a database 240 and one or more programs 250 (e.g., a search engine program) for storing and retrieving data in the database. In an alternative embodiment, the code generation system may output a database structure which forms a digital library 107. In an additional embodiment, a digital library 107 may include a single database. In an another embodiment, the digital library 107 may include a collection of databases. In addition, a search engine program 250 output by the code generator 230 may locate objects or object data in the custom database or digital library 107.

In an alternative embodiment, the same program may both create the database structure 240 and serve as a search

```
<?xml encoding = "US-ASCII"?>
<!--Digital Library schema definitions -->
<!ELEMENT DLSystem (DLIndexClass+,DLRelationship*,DLAttribute+,DLPart*)>
<!--Index class is a list of relationships, attributes, and parts -->
<!ELEMENT DLIndexClass (desc)?>
<!ATTLIST DLIndexClass
     id ID #REQUIRED
     relationships IDREFS #IMPLIED
     dlattributes IDREFS #REQUIRED
     parts IDREFS #IMPLIED>
<!--Relationships connect index classes -->
<!ELEMENT DLRelationship (desc)?>
<!ATTLIST DLRelationship
     id ID #REQUIRED
     type (folder | IDPointer | value) #REQUIRED
     referstoclasses IDREFS #IMPLIED
     fromattribute IDREF #IMPLIED
     toattributes IDREFS #IMPLIED>
<!--attrubutes are data type declarations
     attributes can be in more than one index class -->
<!ELEMENT DLAttribute (desc)?>
<!ATTLIST DLAttribute
     id ID #REQUIRED
     type (VarChar | FixedChar | Integer |
          Time | Long |TimeStamp | Date | Decimal) #REQUIRED
     length CDATA #REQUIRED>
<!-- parts are files or bitstreams -->
<!ELEMENT DLPart (desc)?>
<!ATTLIST DLPart
     id ID #REQUIRED
     partnumber CDATA #REQUIRED
     format CDATA #REQURED>
<!ELEMENT desc (#PCDATA)>
```

CODE GENERATOR SYSTEM FOR DIGITAL LIBRARIES

One embodiment of the present invention provides a code generation system 119. The code generation system 119 engine 250 for that custom database even though FIG. 2 illustrates separate programs for the database structure 240 and search engine 250. The manner in which these components are utilized by the code generation system 119 is explained in further detail with reference to FIG. 3.

Figure 3:
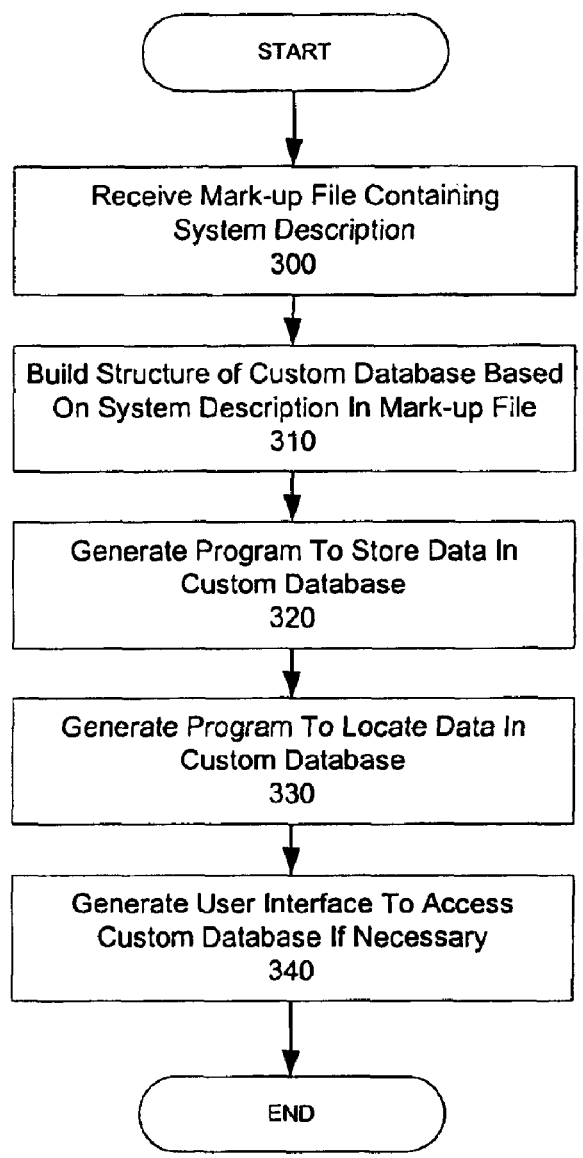
FIG. 3 is a flow diagram illustrating the order of operation of the technique of the code generation system in one embodiment of the present invention.

FIG. 3 is a flow diagram illustrating the technique of the code generation system 119. In block 300, the code generator 230 receives a markup file containing a system description 200 of the structure of the custom database to be created. The system description 200 of the custom database defines the mapping of the abstract digital asset to the physical representation in a database. In other words, the system description 200 defines the structure of the custom database to be created through various objects. For example, the system description 200 may include, a set of data that is to be stored in a database, how that data is to be stored, how the data is linked or associated with other data, and any other information relating to how the data should be stored and/or processed. Those skilled in the art will recognize that numerous other object structures and associations may be represented in the system description 200.

A markup language file stores the system description 200. For example, the system description 200 may be entered into the markup of an Extensible Markup Language (XML) document. In an alternative embodiment of the present invention, the system description 200 may be entered into a Java document. The system description 200 may be entered into a markup file using a text editor 210 or by inputting data through a graphical user interface (GUI) 220. Those skilled in the art will recognize that the system description may be entered using other data entry systems. An example of one embodiment of the present invention includes the following XML document with a system description 200:

<?xml version="1.0"?>
    <!--sample system structure file for a simple video archive-->
    -<DLSystem name="libsrvrx" userid="frnadmin" password="password">
    -<DLIndexClass dlname="VideoAsset">
    <!--Attributes are database columns-->
    <DLAttribute id="VA1" datatype="VarChar">Video_TapeNum</DLAttribute>
    <DLAttribute id="VA2" datatype="VarChar">Video_ProxyID</DLAttribute>
    <DLAttribute id="VA3" datatype="VarChar">Video_Date</DLAttribute>
    <DLAttribute id="VA4" datatype="VarChar">Video_Title</DLAttribute>
    <DLAttribute id="VA5" datatype="VarChar">Video_Type</DLAttribute>
    <DLAttribute id="VA6" datatype="VarChar">Video_IconFile</DLAttribute>
    <DLAttribute id="VA7" datatype="VarChar">Video_NumSBSegments</DLAttribute>
    <DLAttribute id="VA8" datatype="FixedChar">Video_TCCorrection</DLAttribute>
    <DLAttribute id="VA9" datatype="FixedChar" defaultvalue="N">Video_Digitized</DLAttribute>
    <DLAttribute id="VA10" datatype="FixedChar" defaultvalue="T">Video_Status</DLAttribute>
    <DLAttribute id="VA11" datatype="FixedChar" defaultvalue="N">Video_CheckedOut</DLAttribute>
    <DLAttribute id="VA12" datatype="VarChar">Video_COUserName</DLAttribute>
    <DLAttribute id="VA13" datatype="Date">Video_CODate</DLAttribute>
    <DLAttribute id="VA14" datatype="Date">Video_CIDate</DLAttribute>
    <DLAttribute id="VA15" datatype="VarChar">Video_ShowNum</DLAttribute>
    <DLAttribute id="VA16" datatype="VarChar">Video_LoggerID</DLAttribute>
    <DLAttribute id="VA17" datatype="FixedChar">Video_LogDate</DLAttribute>
    <DLAttribute id="VA18" datatype="VarChar">Video_DigitizerID</DLAttribute>
    <DLAttribute id="VA19" datatype="FixedChar">Video_DigitizeDate</DLAttribute>
    <DLAttribute id="VA20" datatype="FixedChar">Video_Group</DLAttribute>
    -<!--Parts are files stored in object servers-->
    -<!--transcript file goes into part 10-->
    <DLPart id="trspart" format="txt">10</DLPart>
    -<!--XML image of asset data goes into part 20, and is indexed by TextMiner-->
    <DLPart id="tmpart" format="xml">20</DLPart>
    -<!--Storyboard as text file, is backed up in part 30-->
    <DLPart id="sbpart" format="txt">30</DLPart>
    -<!--Tar file of .jpgs for storyboard, are backed up in part 40-->
    <DLPart id="tarpart" format="tar">40</DLPart>
    </DLIndexClass>
    -<DLIndexClass dlname="Icons">
    <DLAttribute id="PI1" datatype="VarChar">Video_Category</DLAttribute>
    <DLAttribute id="PI2" datatype="VarChar">Video_IconFile</DLAttribute>
    </DLIndexClass>
    </DLSystem+ particular needs and abilities of a user. For example, Java is a more straight forward language and easier for a user, whereas XML, which is a more structured language, requires more user knowledge and skill due to the more precise programming requirements. Further, more current systems are coded in Java than in XML and thus, documents coded in Java may be more compatible with current systems. However, given the recent surge of XML supporters, this may change in the future. XML may be preferred to Java since Java is not portable to other systems, and the decisions made by a Java program may have to be analyzed to determine how the program is being processed by Java. With XML, users are more able to determine how the XML document is being processed as compared to Java which requires more user analysis. Further, as XML is gaining popularity and is becoming a widely accepted way to describe the structure of documents, industry standard tools can be used with XML documents. Thus, whether an XML document or a Java document is used depends on the skill and needs of individual users and the eventual acceptance of XML. Those skilled in the art will recognize that other document formats besides XML and Java may be used in conjunction with the code generation system 119.

In an alternative embodiment, the data entered into the system description 200 of the markup language file may assume the form of a table. Rows of the table may represent each object to be built. Columns of the table may correspond to an attribute or association of each object identified in rows. Thus, column 1 may represent the storage location, column 2 may indicate that the data is linked to a different table, and so on.

Continuing with block 310, the code generator 230 builds the structure of the custom database 240 based on the system description 200. The database structure 240 may include various objects such as tables, which provide the manner in which data is stored and retrieved. A single system description 200 statement may generate many objects. The objects may form one or more databases which in turn, may form a digital library 107. Thus, based on the statement or statements in the markup file system description 200, a single object may be generated, multiple objects may be generated, or a whole database of objects may be generated.

Generating objects based on system descriptions 200 as compared to programming numerous lines of code can save a significant amount of time. This is especially true if the custom database includes many objects and/or large objects. In addition, if the database is to be altered, the objects forming the custom database can be modified by modifying the system description 200 rather than coding new objects, recoding old objects and reindexing the contents of the custom database after the changes are implemented.

Further, if necessary, objects which were not created by the code generator 230 are manually constructed. In other words, if the code generator 230 did not generate a particular object based on the system description 200, then these remaining objects must be hard coded and added to the custom database structure in order to create a complete custom database or digital library 107. Similarly, any other object changes or deletions which were not implemented with the system description 200 must be hard coded. However, if the code generator 230 can generate all of the objects based on the markup language file 200, then there is no need to perform further programming to construct objects manually.

Additionally, since the system description 200 describes the custom database, there may be more than one description that results in the same custom database. In other words, the system description 200 may be modified while still producing the same database structure 240.

In block 320, the code generator 230 may also generate a program to store data in the custom database. Data is stored and retrieved to and from the custom database based on the generated and any manually constructed objects. In other words, the database structure 240 comprises objects into the desired custom database which may be, for example, a relational database. When objects are stored to the custom database, an index of the contents of the custom database may also be generated.

Different system descriptions 200 may describe the same custom database, and thus, different system descriptions may generate the same database structure 240. In other words, the database structure 240 may be transparent to changes in the system description 200 such that the same database structure 240 is generated with different system descriptions 200.

In block 330, the code generator 230 generates a program, such as a search enaine program 250, to locate data in the database structure 24. When a search query is executed against the database structure 240 by a search engine program 250, the search engine program 250 may refer to the index created for the database structure 240 when the objects were stored, and retrieve the objects or object data requested by the query. As objects are modified or as new objects are added or deleted by, for example, a different system description 200, the search engine program 250 may store or delete these objects and index them accordingly. The search engine program 250 may execute queries against the database structure 240 using search engines executed in Java, Hyper Text Markup Language (HTML) or other high level languages. In addition, the search engine program 250 may be a text search engine. Those skilled in the art will recognize that the code generator 230 may generate search engine programs 250 executable using various language formats.

As previously explained with respect to database structures 240, multiple system descriptions 200 may describe the custom database, and thus, different system descriptions 200 may generate the same search engines 250. In other words, search engines 250 may be transparent to changes in the system description 200.

Then, in block 340, the code generation system generates a user interface to access the custom database if a user interface is needed to enable a user to access the custom database structure 240 and related search engines 250.

CONCLUSION

This concludes the description of embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Additionally it will be understood that the object-oriented framework for providing access control can be used to provide access control to various types of multimedia datastores, and is not limited to a digital library 107. It will also be understood that the functions and methods described in the sample classes above can be varied and modified as necessary without departing from the present invention.

The foregoing description of embodiments of the present invention have been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A computer-implemented method of creating a custom database in a data store connected to a computer, the method comprising:

receiving a system description of a structure of (a) said custom database, and (b) an object, wherein said system description defines a mapping of one or more abstract objects to a physical representation in said structure of said custom database;

generating said structure for said custom database based on said system description; and generating program code based on said system description, wherein said program code includes a module that, when executed, stores said object in said custom database.

2. The method of claim 1, further comprising generating a user interface to access said custom database.

3. The method of claim 1, further comprising modifying said system description and generating a new structure and new program code that are transparent.

4. The method of claim 1, wherein said structure stores data to form a relational database.

5. The method of claim 1, wherein said system description comprises a markup language file.

6. The method of claim 5, wherein said markup language file comprises an extensible markup language (XML) document.

7. The method of claim 6, wherein said XML document is created using a text editor.

8. The method of claim 6, wherein said XML file is created using a graphical user interface.

9. The method of claim 1, wherein said program code includes a module that, when executed, locates data within said custom database.

10. The method of claim 1, wherein said program code comprises a text search engine.

11. The method of claim 1, wherein said program code comprises a high level language.

12. The method of claim 11, wherein said high level language comprises an object-oriented language.

13. An apparatus for creating a custom database comprising:
   a computer having a data store connected thereto, wherein the data store stores data; and
   one or more computer programs, performed by the computer, for:
      (i) receiving a system description of a structure of (a) said custom database, and (b) an object, wherein said system description defines a mapping of one or more abstract objects to a physical representation in said structure of said custom database;
      (ii) generating said structure for said custom database based on said system description; and
      (iii) generating program code based on said system description, wherein said program code includes a module that, when executed, stores said object in said custom database.

14. The apparatus of claim 13, further comprising generating a user interface to access said custom database.

15. The apparatus of claim 13, further comprising modifying said system description and generating a new structure and search engine that are transparent.

16. The apparatus of claim 13, wherein said structure stores data to form a relational database.

17. The apparatus of claim 13, wherein said system description comprises a markup language file.

18. The apparatus of claim 17, wherein said markup language file comprises an extensible markup language (XML) document.

19. The apparatus of claim 18, wherein said XML document is created using a text editor.

20. The apparatus of claim 18, wherein said XML document is created using a graphical user interface.

21. The apparatus of claim 13, wherein said program code includes a module that, when executed, locates data within the custom database.

22. The apparatus of claim 13, wherein said program code comprises a text search engine.

23. The apparatus of claim 13, wherein said program code comprises a high level language.

24. The apparatus of claim 23, wherein said high level language comprises an object-oriented language.

25. An article of manufacture comprising a computer program carrier readable by a computer and embodying one or more instructions executable by the computer to perform steps for creating a custom database, comprising:
   receiving a system description of a structure of (a) said custom database, and (b) an object, wherein said system description defines a mapping of one or more abstract objects to a physical representation in said structure of said custom database;
   generating said structure for said custom database based on said system description; and
   generating program code based on said system description, wherein said program code includes a module that, when executed, stores said object in said custom database.

26. The article of manufacture of claim 25, further comprising generating a user interface to access said custom database.

27. The article of manufacture of claim 25, further comprising modifying said system description and generating a new structure and new program code that are transparent.

28. The article of manufacture of claim 25, wherein said structure stores data to form a relational database.

29. The article of manufacture of claim 25, wherein said system description comprises a markup language file.

30. The article of manufacture of claim 29, wherein said markup language file comprises an extensible markup language (XML) document.

31. The article of manufacture of claim 30, wherein said XML document is created using a text editor.

32. The article of manufacture of claim 30, wherein said XML file is created using a graphical user interface.

33. The article of manufacture of claim 25, wherein said program code includes a module that, when executed, locates data within said custom database.

34. The article of manufacture of claim 25, wherein said program code comprises a text search engine.

35. The article of manufacture of claim 25, wherein said program code comprises a high level language.

36. The article of manufacture of claim 35, wherein said high level language comprises an object-oriented language.

* * * * *